United States Patent [19]
Jansen

[11] Patent Number: 5,699,379
[45] Date of Patent: Dec. 16, 1997

[54] DEGLOR FURNACE

[75] Inventor: Helge Jansen, Friedland, Germany

[73] Assignee: ABB K.K., Tokyo, Japan

[21] Appl. No.: 694,530

[22] Filed: Aug. 9, 1996

[30] Foreign Application Priority Data

Aug. 9, 1995 [DE] Germany ............... 195 29 190.5

[51] Int. Cl.⁶ .................. F27D 17/00; H05B 3/06
[52] U.S. Cl. ................ 373/8; 219/542; 266/242; 75/10.14
[58] Field of Search ............... 373/9, 8, 32, 35, 373/41; 219/542; 266/242, 280, 286, 144, 155; 75/10.14, 10.15

[56] References Cited

U.S. PATENT DOCUMENTS

| | | | |
|---|---|---|---|
| 2,331,052 | 10/1943 | Shadduck | 65/134.4 |
| 2,413,037 | 12/1946 | De Voe | 373/31 |
| 5,489,085 | 2/1996 | Ammon et al. | 266/155 |
| 5,490,869 | 2/1996 | D'Obrenan et al. | 75/10.14 |
| 5,574,746 | 11/1996 | Ammon et al. | 373/9 |

*Primary Examiner*—Tu B. Hoang
*Attorney, Agent, or Firm*—Herbert L. Lerner; Laurence A. Greenberg

[57] ABSTRACT

A Deglor furnace includes a ceiling and at least one heating module integrated into the ceiling for heating. The heating module has an electric heater.

7 Claims, 3 Drawing Sheets

DEGLOR FURNACE

BACKGROUND OF THE INVENTION

1. Field of the Invention

The invention relates to a Deglor furnace having an electric heater which is attached to the ceiling of the furnace.

Deglor furnaces are provided for vitrifying ash from refuse incineration plants. Contaminants contained in the ash are vaporized and separated off. The vitrified constituents can be used as building materials or for land-fills. Deglor furnaces operate at temperatures between 1300° C. and 1500° C. For that purpose, every Deglor furnace is provided with electric heating elements in its ceiling area. The heating elements known heretofore are surrounded on the outside by a protective ceramic tube which is permanently sealed at one end and has a detachable closure at the other end.

German Published, Non-Prosecuted Patent Application DE 43 28 718 A1, corresponding to U.S. application Ser. No. 08/429,305, filed Apr. 26, 1995, discloses a Deglor furnace in which the protective ceramic tube has a flange at its open end and the flange is formed by a metal clip. The clip is attached by one or more bolts to the outside of the protective tube. A U-shaped heating rod is disposed within the protective tube. Its electrical connections are run to the outside through the detachable closure. The protective tube is run through an opening in the ceiling into the interior of the Deglor furnace. Since the protective tubes with the heating rods are disposed perpendicularly to the ceiling, they require a large amount of space in the Deglor furnace, which cannot be used for other purposes. In addition, with that heating configuration, the heating rods radiate parallel to the surface to be heated, as a result of which energy losses occur due to radiation directly into the walls of the Deglor furnace.

SUMMARY OF THE INVENTION

It is accordingly an object of the invention to provide a Deglor furnace, which overcomes the hereinafore-mentioned disadvantages of the heretofore-known devices of this general type.

With the foregoing and other objects in view there is provided, in accordance with the invention, a Deglor furnace, comprising a ceiling; and at least one heating module integrated into the ceiling for heating, the at least one heating module having an electric heater.

In accordance with another feature of the invention, the heating module according to the invention is equipped with a U-shaped, electric heating rod which is attached to a carrier and covered by a protective plate. The heating rod is operated electrically.

In accordance with a further feature of the invention, the carrier is constructed as a parallelepiped component with defined dimensions.

In accordance with an added feature of the invention, the carrier is manufactured from a thermally insulating and electrically non-conductive material, preferably from vacuum-formed $Al_2O_3$ boards or mullite fiber boards.

In accordance with an additional feature of the invention, the electrical connection elements of the U-shaped heating rod are run through holes to the second surface of the carrier and protrude beyond the second surface to the outside.

In accordance with yet another feature of the invention, in order to heat a Deglor furnace, a plurality of heating modules are integrated into the ceiling of the Deglor furnace. A holding device in the form of a frame is installed in the ceiling in order to hold the heating modules. The frame is open towards the interior of the Deglor furnace and towards the outside. The inner boundary of the frame is located in a plane with the inner surface of the ceiling. The frame is likewise produced from a gas-tight material. The heating modules are fitted onto the frame in such a way that the protective plates face towards the interior of the Deglor furnace, while the electrical connection elements are directed towards the outside. The level of the heating modules is selected in such a way that the second surface of each carrier is located in a plane with the surface of the ceiling. In order to ensure complete sealing of the Deglor furnace from the outside, a gas-tight separating wall, which is manufactured from pore-free ceramics, is disposed between every two adjacent modules.

In accordance with a concomitant feature of the invention, the heating modules are fitted into the holding device with the protective plates of the heating modules forming an inner boundary of the ceiling and being disposed in a plane with a remainder of the interior surface of the ceiling, and the second surfaces of the carriers form an outwardly facing boundary of the ceiling disposed in a plane with the remainder of the surface of the ceiling.

Other features which are considered as characteristic for the invention are set forth in the appended claims.

Although the invention is illustrated and described herein as embodied in a Deglor furnace, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
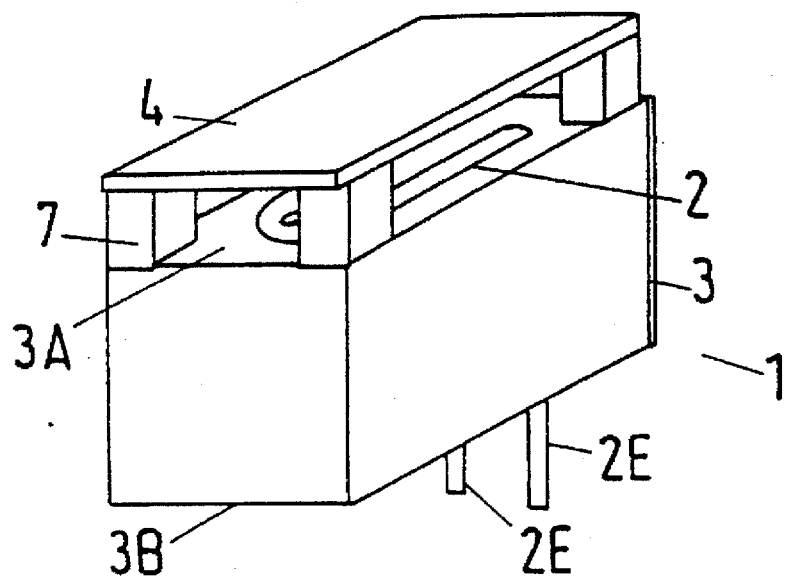
FIG. 1 is a diagrammatic, perspective view of a heating module according to the invention.

Referring now to the figures of the drawings in detail and first, particularly, to FIG. 1 thereof, there is seen a heating module 1 which is formed essentially from a U-shaped heating rod 2, a carrier 3 and a protective plate 4. The U-shaped heating rod 2 is operated electrically and is installed on a first surface 3A of the carrier 3. The carrier 3 is constructed as a parallelepiped component with defined dimensions. In the embodiment illustrated herein, the carrier 3 has a length of 800 mm, a width of 150 mm and a height of 100 mm and it is produced from a thermally insulating and electrically non-conductive material. The carrier 3 is preferably manufactured from vacuum-formed $Al_2O_3$ boards or mullite fiber boards. The heating rod 2 is installed centrally on the surface 3A of the carrier 3 in such a way that the longitudinal axis of its U-shaped region is disposed parallel to the longitudinal axis of the carrier 3. The length of the U-shaped heating rod 2 is selected in such a way that it is slightly shorter than the length of the carrier 3. It is preferably 500 mm in the exemplary embodiment illustrated herein.

Figure 2:
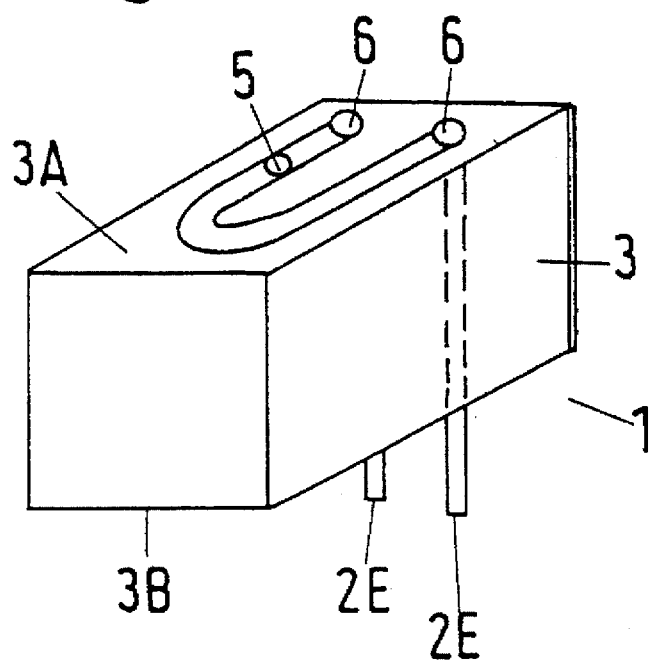
FIG. 2 is a perspective view of a sub-region of the heating module shown in FIG. 1.

As FIG. 2 shows, the U-shaped heating rod 2 is held on the surface 3A of the carrier 3 through the use of two or more attachment elements 5. The attachment elements 5 are produced from a corrosion-resistant material. A first end of each attachment element 5 is anchored in the carrier 3, while a second end is laid around the U-shaped heating rod 2 in a manner similar to a clamp. Preferably, the attachment elements 5 are constructed as a component of the carrier 3. Electrical connection elements 2E of the U-shaped heating rod 2 are run through holes 6 to a second surface 3B of the carrier 3 and protrude, as shown by FIGS. 1 and 2, beyond the surface 3B to the outside.

As FIG. 1 shows, the protective plate 4 is disposed at a defined distance above the U-shaped heating rod 2. The dimensions of the protective plate 4 are matched to the size of the surface 3A of the carrier 3. The protective plate 4 is disposed in such a way that it completely covers the surface 3A of the carrier 3. In the exemplary embodiment illustrated herein, a spacing element 7 is disposed at each corner of the surface 3A of the carrier 3 and is permanently connected to the carrier 3 in order to hold the protective plate 4. The spacing elements 7, like the protective plate 4, are produced from a gas-tight material which conducts heat well. They are preferably produced from $Al_2O_3$, a spinel or from $MgO_2$. The dimensions of the spacing elements 7 are selected in such a way that the distance between the U-shaped heating rod 2 and the protective plate 4 is approximately 10 mm.

Figure 3:
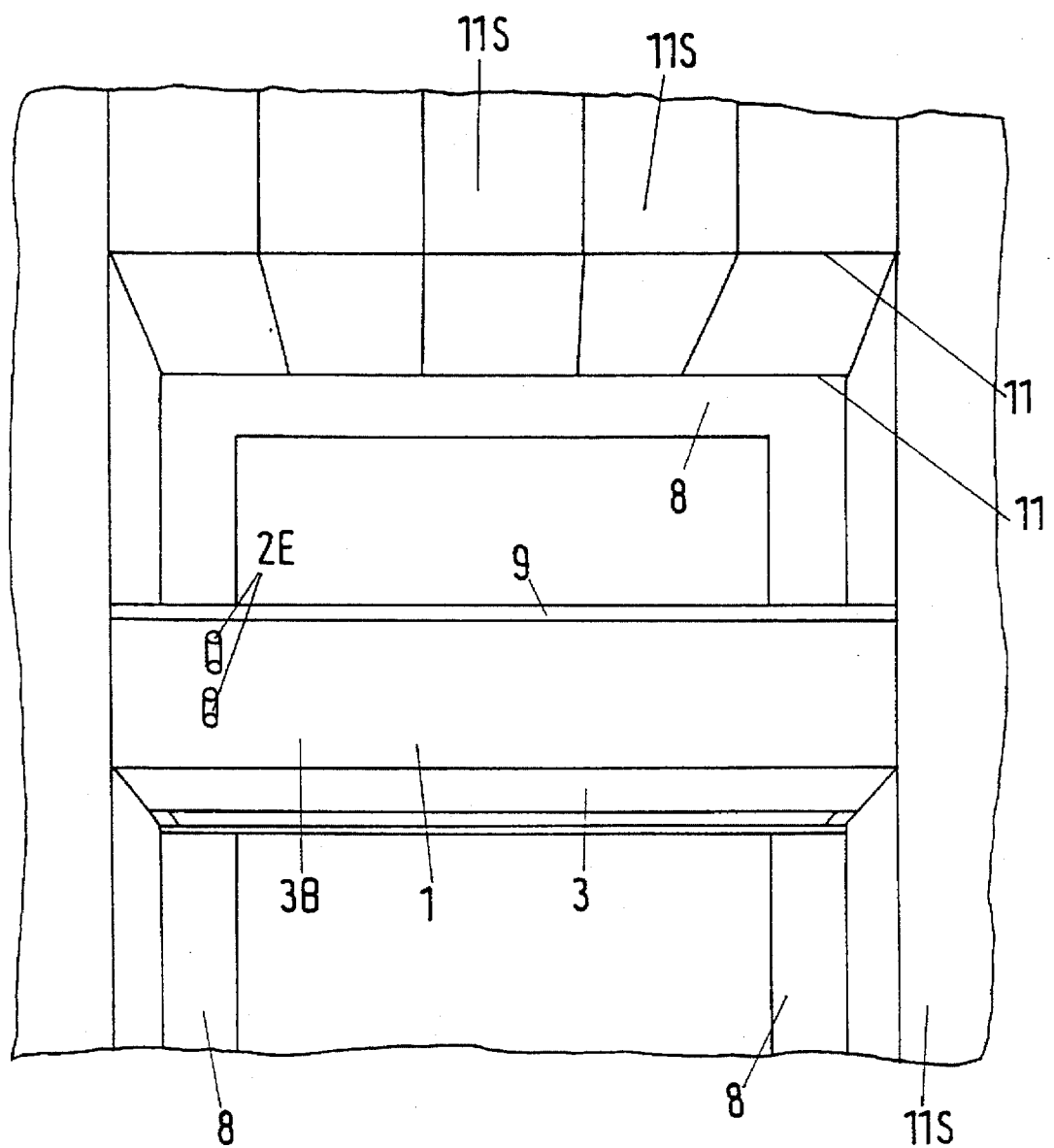
FIG. 3 is an enlarged, fragmentary, perspective view of a heating module integrated into a ceiling of a Deglor furnace.
Figure 4:
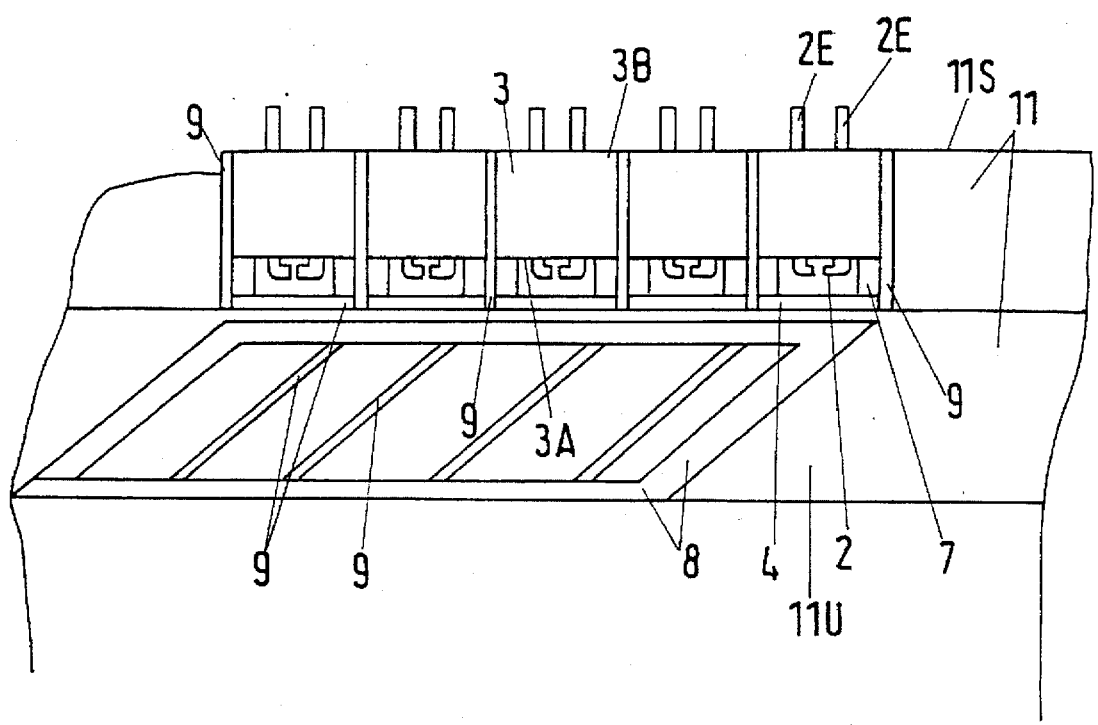
FIG. 4 is a further fragmentary, perspective view of the ceiling area shown in FIG. 3.

In order to heat a Deglor furnace 10, certain regions of which are illustrated in FIGS. 3 and 4, a plurality of the heating modules 1 which are illustrated in FIGS. 1 and 2 and explained in the associated descriptions, are integrated into a ceiling 11 of the Deglor furnace 10. These heating modules 1 are rotated through 180° with respect to the illustrations shown in FIGS. 1 and 2 before they are installed in the ceiling 11.

The ceiling 11 includes bricks 11S which are produced from the same material as the carriers 3. A holding device 8 in the form of a frame is installed in the ceiling 11 in order to hold the heating modules 1, as can be seen with reference to FIGS. 3 and 4. The frame 8 is open towards the interior of the Deglor furnace 10. The frame 8 has a boundary facing towards the interior of the Deglor furnace 10 which is located in a plane with an inner surface 11U of the ceiling 11. The frame 8 is likewise produced from a gas-tight material. The heating modules 1 are fitted onto the frame 8 in such a way that the protective plates 4 face towards the interior of the Deglor furnace 10, while the electrical connection elements 2E point towards the outside. The heating modules 1 are held on the frame 8 only by their weight so that further attachment elements are not necessary. As is clear from FIG. 4, the level of the heating modules 1 is selected in such a way that the second surface 3B of each carrier 3 is located in a plane with a surface of the ceiling 11.

In order to achieve complete sealing of the Deglor furnace 10 from the outside, a gas-tight separating wall 9, which is manufactured from pore-free ceramics that conduct heat, is disposed between every two adjacent heating modules 1. Identical separating walls 9 are disposed between the bricks 11S of the ceiling 11 and the directly adjoining heating modules 1. With the aid of this separating wall 9, gases are prevented from being able to escape from the Deglor furnace 10 to the outside.

I claim:

1. A Deglor furnace, comprising:

a ceiling; and at least one heating module including a carrier having first and second surfaces and an electric heater having a U-shaped heating rod attached to said first surface of said carrier integrated into said ceiling for heating, said heating rod having two electrical connection elements extending through said carrier to said second surface of said carrier.

2. The Deglor furnace according to claim 1, wherein said carrier is constructed as a parallelepiped component with defined dimensions and is produced from a thermally insulating and electrically non-conductive material.

3. The Deglor furnace according to claim 1, wherein said carrier is manufactured from a material selected from the group consisting of vacuum-formed $Al_2O_3$ boards, mullite fiber boards and a refractory brick.

4. The Deglor furnace according to claim 1, including a protective plate for protecting said U-shaped heating rod against corrosion, said protective plate being disposed at a defined distance above said first surface of said carrier and being of the same size as said first surface, and at least one spacing element attaching said protective plate to said first surface.

5. The Deglor furnace according to claim 1, including:

at least one holding device having two openings formed therein and being in the form of a frame for receiving a plurality of said at least one heating module installed in said ceiling, said frame being produced from a gas-tight material;

gas-tight separating walls each being disposed between every two adjacent heating modules in said holding device; and said ceiling being formed by said frame, said heating modules and said gas-tight separating walls in the vicinity of said holding device.

6. The Deglor furnace according to claim 5, wherein:

said heating modules each include a protective plate for protecting said U-shaped heating rod against corrosion, said protective plate being disposed at a defined distance above said first surface of said carrier and being of the same size as said first surface, and at least one spacing element attaching said protective plate to said first surface;

said ceiling has an interior surface;

said heating modules are fitted into said holding device with said protective plates of said heating modules forming an inner boundary of said ceiling and being disposed in a plane with a remainder of said interior surface of the ceiling; and said second surfaces of said carriers form an outwardly facing boundary of said ceiling disposed in a plane with said remainder of said surface of said ceiling.

7. The Deglor furnace according to claim 5, including additional gas-tight separating walls being disposed between said ceiling and said heating modules located directly adjacent said ceiling.

* * * * *